United States Patent
Bodö et al.

[11] Patent Number: 6,068,801
[45] Date of Patent: May 30, 2000

[54] METHOD FOR MAKING ELASTIC BUMPS FROM A WAFER MOLD HAVING GROOVES

[75] Inventors: Peter Bodö, Lindköping; Hjalmar Hesselbom, Huddinge, both of Sweden

[73] Assignee: Telefonaktiebolaget LM Ericsson, Stockholm, Sweden

[21] Appl. No.: 08/995,194

[22] Filed: Dec. 19, 1997

[30] Foreign Application Priority Data

Dec. 19, 1996 [SE] Sweden ................................ 9604675

[51] Int. Cl.[7] .............................. B28B 7/24; B28B 7/38; B29C 33/64
[52] U.S. Cl. .............................. 264/39; 264/82; 264/219; 264/255; 264/309; 264/338
[58] Field of Search ............................. 264/39, 82, 309, 264/255, 338, 219

[56] References Cited

U.S. PATENT DOCUMENTS

| | | | |
|---|---|---|---|
| 4,263,350 | 4/1981 | Valimont | 427/325 |
| 4,775,544 | 10/1988 | Ponjee | 427/133 |
| 4,937,653 | 6/1990 | Blonder et al. | 357/68 |
| 4,946,369 | 8/1990 | Beck et al. | 427/133 |
| 5,064,583 | 11/1991 | Dagostino et al. | 264/39 |
| 5,151,276 | 9/1992 | Sato et al. | 425/110 |
| 5,217,568 | 6/1993 | Tessier et al. | 156/659.1 |
| 5,243,756 | 9/1993 | Hamburgen et al. | 29/841 |
| 5,343,544 | 8/1994 | Boyd et al. | 385/46 |
| 5,439,569 | 8/1995 | Carpio | 204/153.1 |
| 5,620,634 | 4/1997 | Shahid | 264/1.25 |

FOREIGN PATENT DOCUMENTS 0 244 884  11/1987  European Pat. Off. .

OTHER PUBLICATIONS

Derwent's Abstract, No. 85–076636, Oct. 17, 1984.
Derwent's Abstract No. 85–076637, Oct. 17, 1984.
Patent Abstracts of Japan, No. 61–23313, Jan. 31, 1986.

*Primary Examiner*—Jill L. Heitbrink
*Assistant Examiner*—Suzanne E. Mason
*Attorney, Agent, or Firm*—Burns, Doane, Swecker & Mathis, L.L.P.

[57] ABSTRACT

This invention relates to a manufacturing process for making elastic bumps in the micro-electronic field. It solves the problem to mould micrometer sized elastic features by means of a micro-machined mould. The method is a reproducible moulding technology to achieve elastic bumps being a perfect replication of the mould. The mould is made of one or several grooves etched in a silicon wafer. The method includes the steps of: cleaning the surface of the mould (100) from dust and other particles; depositing a release agent on the mould and the release agent, e.g. Parylene or silane, forming a conformal self-assembled layer (118) on the surface of the mould; putting on a curable elastomer, to form an elastomeric structure (208) on the mould; curing the mould and the structure; and separating the structure from the mould.

14 Claims, 3 Drawing Sheets a b c e d f

METHOD FOR MAKING ELASTIC BUMPS FROM A WAFER MOLD HAVING GROOVES

TECHNICAL FIELD OF THE INVENTION

The present invention relates to a manufacturing process for making bumps in the micro-electronic field, more particular to the method for moulding the elastic bump.

DESCRIPTION OF RELATED ART

In many different fields it is desirable to form small elastic features or bumps of very precise dimensions in the micrometer range. In the specific field of electronics and opto-electronics micro-miniaturisation has come very far requiring very high precision placement of parts which become very expensive unless such placement can be performed using some kind of self-alignment procedures. Also, the reduced sizes and increased speed of the electronics paths leads to increased power densities. Higher temperatures or higher temperature differences in systems pronounce thermal mismatch problems. Small elastic bumps manufactured with very high precision may be used for electric connectors and mechanical alignment of components. Elastomers, and especially silicone elastomers, are frequently used in electronic production and show excellent properties. However, conventional moulding techniques have limited performance with respect to dimensions, in the micrometer range, needed for chip scale applications.

In order to form the bumps, it is possible to use an elastomer containing a release agent or deposition of a non-conformal layer on the mould. The disadvantages of the methods above are that a release agent will stay as a weak surface layer on the moulded parts and the non-conformal layer limits the replication, respectively.

The U.S. Pat. No. 5,064,583, John J. Dagostino et. al, describes a method for depositing silane release layer. However, the environment during deposition is not restricted to be free from moisture, hence, conformal layers are not produced.

The European patent application 0 244 884 A1, Ponjèe Johannes Jacobus, describes a method for making a very thin release layer of anhydrously deposited silane, but does not mention moulds of Si with etched V-grooves.

SUMMARY

The invention has solved the problem to mould micrometer sized elastic features by means of a micro-machined Si-mould.

The present invention will be used for products in the fields of electronics and opto-electronics for electrical and optical connectors and mechanical alignment of components.

There are also other application fields which demand small sized elastic features of high precision. This invention describes a reproducible moulding technology to achieve elastic bumps being a perfect replication of the mould. The groove may be of 5 corner pentahedron or pyramidical form and the bump may be of truncated 5 corner pentahedron or truncated pyramidical form. The mould is made from one or several grooves etched in a silicon wafer of the same type as used in IC manufacturing, by means of grooves etched in a polished side. A release agent is used, since otherwise the elastomer, typically a silicone elastomer, will adhere very strongly to the surface of the mould during curing. The release agent can be, e.g. Parylene or silane. After deposition of the release agent on the mould, the liquid un-cured elastomer is added to the mould and cured in an oven.

The present invention applies a deposition technique and materials to achieve a release agent, which forms an extremely conformal layer on the surface of the mould, thereby preserving nanometer sized details of the topography and overall dimensions of the mould. Using such a mould, described above, it is possible to make the elastomeric bumps of very high precision. They can be moulded to a separate structure or onto most substrates.

One advantage of the present invention is that it uses known materials and deposition techniques to form the extremely conformal layer on the Si-mould such that the elastomer does not adhere.

Another advantage of the present invention is that the release layers are extremely conformal.

A further advantage of the present invention is moulding of micrometer sized features.

A further advantage of the present invention is that the elastic bumps are a perfect replication of the mould.

A further advantage of the present invention is that it is easy to prepare the release agent layer on the mould.

A further advantage of the present invention is that the same mould can be reused.

The invention is now being described further with the help of the detailed description of the preferred embodiments and the attached drawings.

DETAILED DESCRIPTION OF EMBODIMENTS

This invention solves the problem to process a micromachined Si-mould, which forms elastomeric features or bumps with an accuracy in dimensions in the sub-micrometer range, i.e. being a perfect replication of the mould used, and easily to separate the bumps from the mould.

Figure 1:
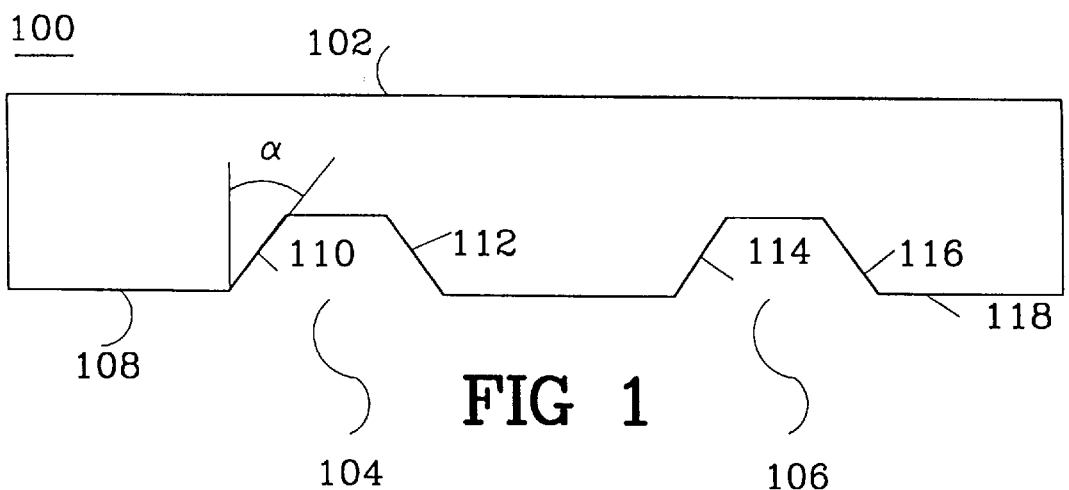
FIG. 1 shows a cross section of a typical mould having grooves.

To make the elastic bumps a mould 100 is used, see FIG. 1. The prepared mould 100 is made of micro-machined Si wafer. Grooves in the mould 100 are made in the traditional way. When making the grooves 104, 106 an etch mask is used. Depending on the opening size in the etch mask, the depth and shape of the grooves 104, 106 are determined, which in turn determines the size and the shape of the bumps 202, 204, see FIG. 2. Before applying the silicone elastomer a release agent is needed because the elastomer, typically silicone elastomer, will adhere very strongly to the surface of the mould 100 during curing. The release agent can be Parylene or silane, which agent forms a release layer 118 which is conformal over the surface. After deposition of the release agent on the mould 100, the liquid un-cured elastomer is added to the mould and cured in an oven. The bumps 202, 204 can be form by etching the mould 100, either to make the bumps separately forming a thin separate structure, with the bumps on one or two side/s, see FIG. 3, or the bumps are made onto any substrate, see FIG. 2.

A more detailed description of how to make bumps will be described below. Very well defined rectangular or square grooves 104, 106 can be made in a single crystalline silicon wafer, if it is etched anisotropically, e.g., in (100),(110), (111) wafers. The size and shape of the grooves is exactly the same as the wanted elastomeric bumps. One etching technique is anisotropic etching and the use of (100) oriented wafers. Micro-machining of grooves 104, 106 in silicon wafers, and other single crystal materials, by the anisotropic etching is a well known technology. The etch mask to be used may consist of a $Si_3N_4$ film (~1600 Å) and an intermediate $SiO_2$ film (~550 Å) to reduce stresses in the nitride. An etchant which is often used is 4 M solution KOH, for which typical relative etch rates for the three main crystal orientations (100):(110):(111), are 100:160:1. The etching is performed at 75–85° C. To etch through a (100) wafer, ≈500 $\mu$m thick, takes about 8 hours. Using (100) oriented wafers generates V-grooves, which side walls 110–116 are obtained in the grooves 104, 106 in {111} planes, which have an angle $\alpha$ of 54.7° relative to a surface normal of the (100) wafer. The width and position of the grooves 104, 106 on the wafer are determined by openings in the etch mask prepared by standard processes for electronic productions at a resolution in the sub-micrometer range. The reproducibilities of mask lithography and silicon etching are very high.

Figure 2:
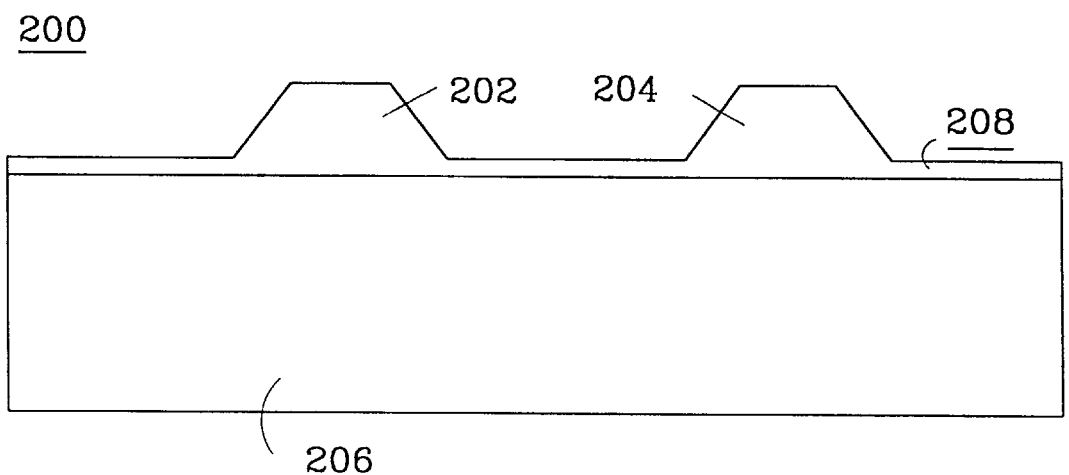
FIG. 2 shows a cross section of elastic bumps moulded on a substrate.
Figure 3A:
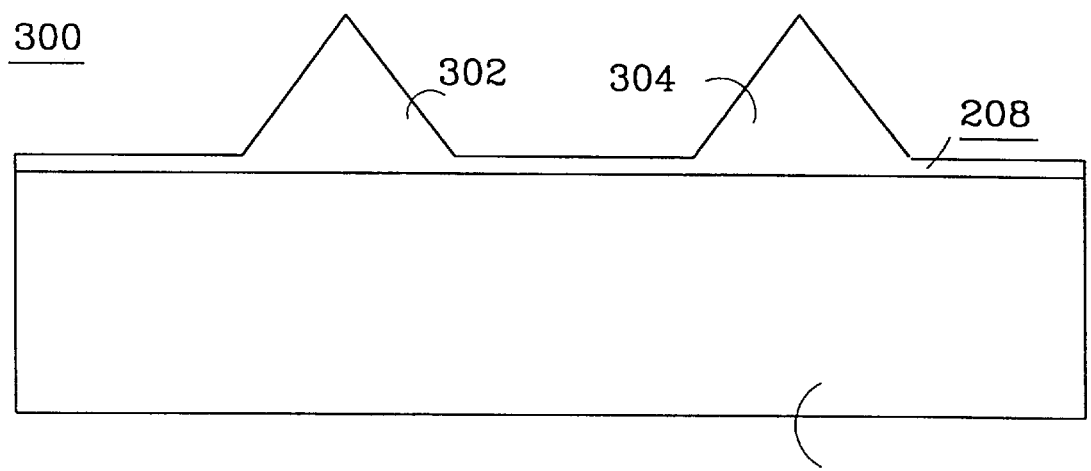
FIGS. 3a–b show cross sections of alternative elastic bumps moulded on a substrate.

FIG. 2 shows very well defined bumps 202, 204 on a substrate 206, which are replicas of the above made grooves 104, 106, see FIG. 1. The following technique is used. When the mould 100 is made the release agent is used so that the elastic material will not stick onto the mould 100 surface. This makes the mould 100 reusable. Each time when making the bumps 202, 204 they will have the same structure as previous bumps made of the same mould 100. Structure 208 which contains the bumps 202, 204 will have exactly the same layout, with size and distances from each other as in the mould 100. Before putting on the release agent on the surface of the mould 100, it is necessary to remove dust and other particles from the mentioned surface. A very fine layer of oxide will remain on the surface. Thereafter the mould 100 is dipped into an ethanol liquid, which has a small amount of silane. The silane will form a mono-layer surface on the mould 100, which will constitute the release agent. It forms a very thin and conformal film 118 by growth. Another way to apply the release agent is to use a gas phase deposition method. The next step is to cover the mould 100 with a curable elastic compound, while controlling thickness by using spinning, scraping or spraying. Subsequently, the mould 100 and the substrate 206 are pressed together. Depending on the complexity of the structure to be moulded, air bubbles may be trapped in the elastomer during deposition. Such possible bubbles may be removed by placing the package in vacuum before curing. It may also be considered to align the substrate relative to the mould to achieve bumps at a specified position on the substrate. The package is then placed in an oven at elevated temperature to cure the compound typically at 150° C. for 2 hours. Through curing, the elastomeric material will be formed after the grooves 104, 106 in the mould 100. After curing, the structure 208 is separated from the mould 100. If a stiff substrate would be used, then it would be required that the separation be in a vacuum due to the hermetic fit of the compound to the mould 100. For special applications the substrate 206 could be made of elastic material which would facilitate separation. Also, the mould could be made so that the bumps 202, 204 can get peaked 302, 304, see FIG. 3a, instead of being truncated. Other possible structures of the bumps can be seen in FIG. 3b. The shapes of the bump structures are not restricted to those shown in the FIG. 2 to FIG. 5.

Different types of high precision components can be prepared: free-standing parts with bumps by the use of one or two part mould; bumps on a rigid or flexible substrate by applying the silicone elastomer between the mould and the substrate. The use of the flexible substrate such as a polymer foil simplifies the separation from the mould, especially in the case of components over a large area. When required, this invention also makes it possible to prepare the substrate with elastomeric bumps and a very thin layer of silicone between the bumps. The un-cured elastomer is in that case spin-coated on the mould enabling a controlled thickness of elastomer. The substrate is then placed on top of the elastomer film (possible air bubbles can be removed by vacuum) before curing. As mentioned above, the silicone elastomers adhere very strongly to silicon and therefore a special surface treatment with release agent is used to enable separation of the cured silicone elastomer from the mould 100. For this purpose this invention includes two alternative methods, the silane method and the Parylene method. Both result in a chemically inert surface of low surface energy from which the silicone elastomer easily can be removed.

The silane method makes use of the ability to form a self assembled mono-layer (SAM) of silane on a surface of oxidised silicon. Before silane is deposited on to the silicon mould 100, it has to be cleaned, for example in two known steps using $H_2O_2$, $NH_3$ and $H_2O_2$, HCl solutions, resulting in a thin layer of native oxide. The mould is subsequently treated in silane, e.g. 1% dimethyl-dichlorosilane solution, using ethanol as the solvent and thereafter rinsed in ethanol, in which it also can be stored before use. The resulting release agent layer consists of a mono-layer of silane molecules standing close to each other on the surface preventing the silicone elastomer from adhering to the mould. After moulding, the mould can be reused directly or re-silaned to ensure a fresh release agent layer free from possible mechanical damage.

The commercially available Parylene method produces an extremely conformal poly-para-xylylene coating, which uniformly covers the edges and bottoms of the grooves. The surface to be coated, kept at room temperature, is exposed to the monomer vapour, para-xylylene at 0.1 Torr, which condenses and polymerises on all surfaces exposed to the gas, under the reaction:

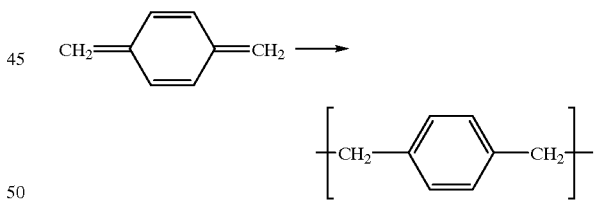

The melting temperature is 405° C., enabling the cure of the elastomer, and there are many other good properties such as high chemical resistance. Parylene layers of any thickness may be prepared, and to serve as a release agent a very thin film is only required. However, making a thickness of a few tenths of a micrometer gives a good mechanical stability for repeated use of the same mould.

Of course not only silane or Parylene can be used as the release agent. For example any suitable self-assembled mono-layers with a non-reactive tail can be used.

Figure 3B:
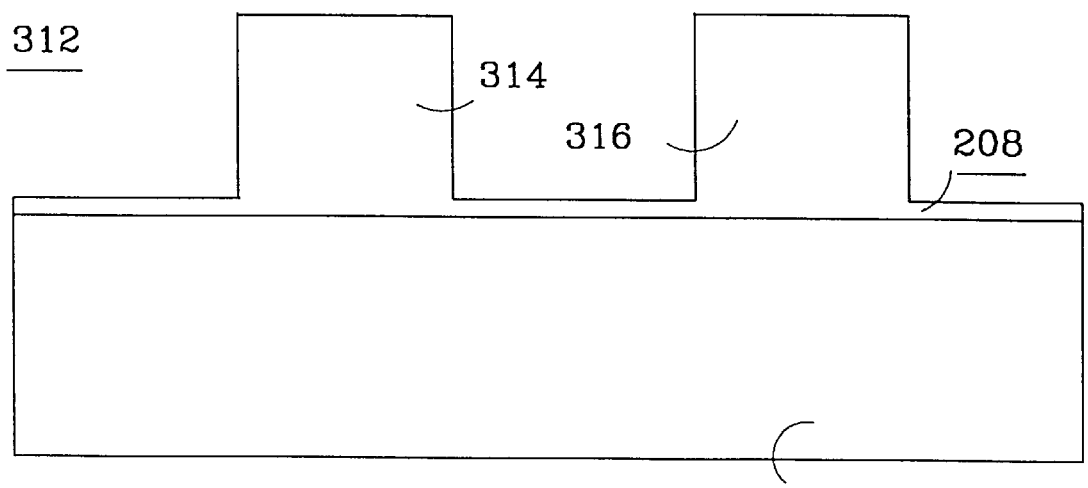
Figure 5:
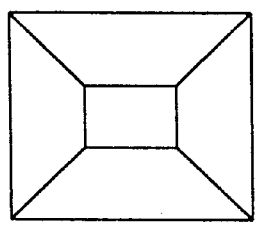
FIGS. 5a–f show top views of different elastic bumps.
Figure 5:
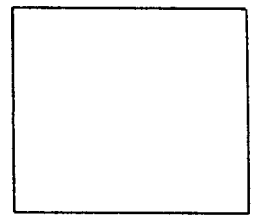
Figure 5:
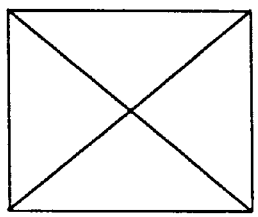
Figure 5:
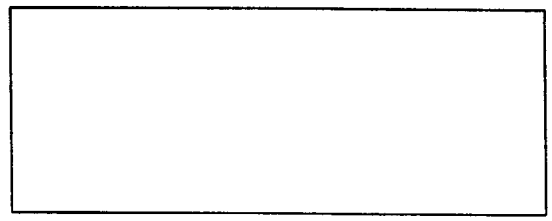
Figure 5:
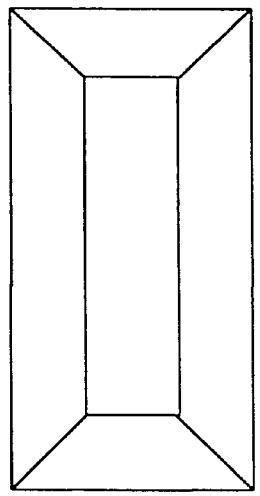
Figure 5:
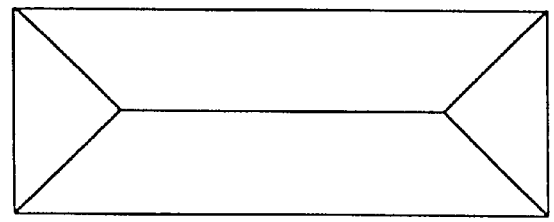

FIG. 3 shows the side view of different bumps, which that can be made on the substrate 206. In a first set 300 the structure 208 has bumps 302, 304, which are formed like an upside-down V, V shaped bumps. In FIG. 3b a second set 312 has the structure 208 and the bumps 314, 316, which are formed like pins. Naturally, the mould for making grooves has to have exactly the same shape as the bumps in these figures. Preparing the mould is a bit different than making the first set 300 of the bumps 302, 304. Instead of stopping the etching before reaching the bottom like in FIG. 1, here the etching is continued until both inclined walls 110–116 have reached each other. In the next set 312 of the bumps 314, 316 the mould has to be made from a <110>wafer.

Figure 4:
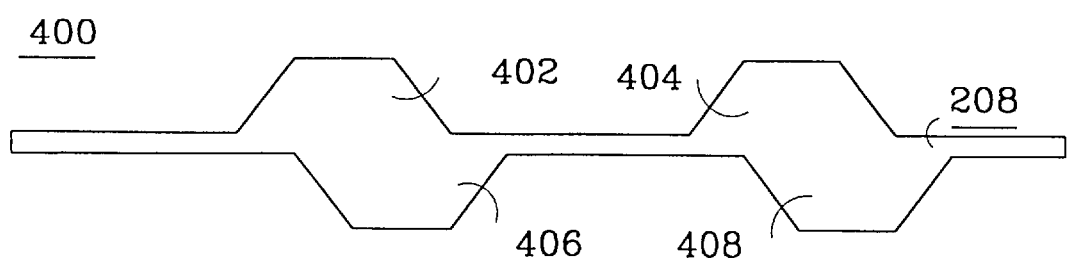
FIG. 4 shows an alternative structure of a cross section of free standing elastic bumps.

FIG. 4 bumps are made on both sides of the structure 208. This is done by using exactly the same method as described above, but before curing the silicone elastomer a similar or a different mould, as used before, is used on top of the elastomer layer. The similar mould could be of the same shape as the mould 100, FIG. 1, or have a different shape to form the grooves. After curing the two moulds are taken away. The structure 208 has formed a set of bumps 402–408 forming a fourth set 400.

FIGS. 5*a–c* show the top view of squared bumps 202, 302 and 314 and FIG. 5*d–f* shows a top view of rectangular bumps 202, 302 and 314.

The above mentioned structures and the shapes of the bumps is not restricted to these described ones. They may have other structures and forms which are not shown.

Another method for making the preferred bumps and the preferred grooves is using photolithographic masking aligned to already existing structures, e.g., lasers or IC:s. Before they have been separated, grooves are made either using anisotropic etching or other techniques. Similar, but mirrored grooves are also made in similar or dissimilar material which is used as a mould. Either this mould, or the part onto which the elastic bumps will be attached, is then covered with the elastic material in its pre-cured form, where after that the part and the mould is pressed together in vacuum. Hereby the elastic material fills the grooves in the mould. After this, the elastic material is cured using heat or possibly light, if the mould or part, is translucent for the curing light, and at last the mould separated from the elastic material.

The invention described above may be embodied in yet another specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A method for making bumps comprising the steps of forming grooves on a surface of a wafer, thereby forming a mold surface; cleaning the mold surface from dust and other particles; depositing a release agent layer on the mold surface, thereby forming a self-assembled mono-layer; putting on a curable elastomer to form an elastomeric structure on the mold surface; curing the mold surface and the structure; and separating the structure from the mold surface.

2. The method according to claim 1, wherein the cleaning step comprises two steps: firstly using $H_2O_2$ and $NH_3$, and secondly $H_2O_2$ and HCl solutions.

3. The method according to claim 2, wherein the step of depositing the release agent layer comprises: the mold surface is put into an anhydrously dimethyldichlorosilane solution, and then rinsed in ethanol.

4. The method of claim 3, wherein the release agent layer comprises a mono layer of silane molecules.

5. The method of claim 3, wherein the step of forming grooves on a surface of the wafer comprises forming grooves having a form chosen from the group consisting of: truncated pyramidical and square.

6. The method according to claim 1, wherein the step of depositing the release agent layer comprises: the mold surface is exposed to gas, a monomer vapor of para-xylylene; polymerising all surfaces exposed to the gas; curing at a melting temperature of about 400° C. thereby forming a conformal poly-para-xylylene coating.

7. The method according to claim 1, wherein the step of putting on the curable elastomer comprises one of spinning, scraping or spraying.

8. The method according to claim 1, wherein the curable elastomer comprises silicone elastomer.

9. The method according to claim 1, wherein the method further comprises the step of putting on a substrate onto the structure before curing.

10. A method according to claim 9, wherein the substrate is a flexible material.

11. The method according to claim 1, further comprising the step of putting another mold surface on top of the elastomeric structure before curing.

12. The method of claim 1, wherein the step of forming grooves comprises forming grooves on a surface of a silicon wafer.

13. The method of claim 1, wherein the bumps are sized in the micrometer-range.

14. The method of claim 1, wherein the step of forming grooves further comprises masking a surface of the wafer, and etching the masked surface.

* * * * *